(No Model.)
G. W. CHELTON.
ROLLER BEARING.
No. 545,150. Patented Aug. 27, 1895.
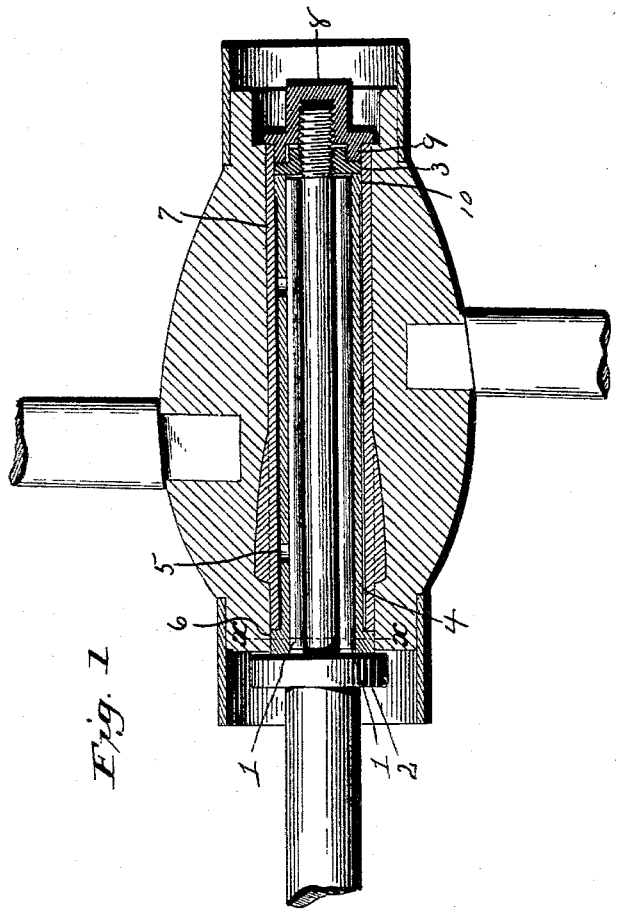
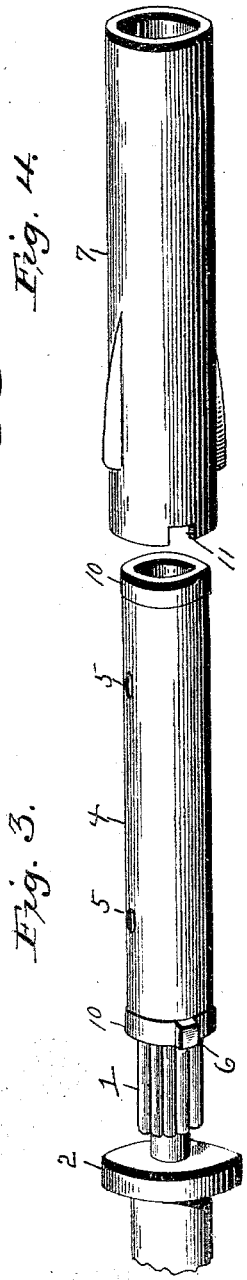
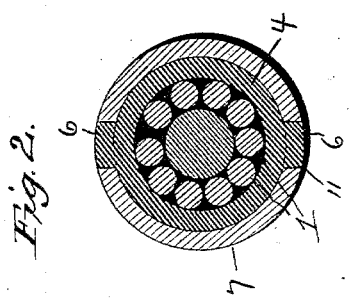
Witnesses:
L. C. Hills.
E. C. Catts.
Inventor:
George W. Chelton
By Glascock & Co.
Attys.

UNITED STATES PATENT OFFICE.

GEORGE W. CHELTON, OF CRISFIELD, MARYLAND, ASSIGNOR TO HIMSELF, ISAAC H. COALBAUM, AND CLARENCE P. LANKFORD, OF SAME PLACE.

ROLLER-BEARING.

SPECIFICATION forming part of Letters Patent No. 545,150, dated August 27, 1895.

Application filed April 5, 1895. Serial No. 544,599. (No model.)

*To all whom it may concern:*

Be it known that I, GEORGE W. CHELTON, a citizen of the United States, residing at Crisfield, in the county of Somerset and State of Maryland, have invented a certain new, useful, and valuable Improvement in Roller-Bearings, of which the following is a full, clear, and exact description.

My invention has relation to roller-bearings; and it consists in the novel construction and arrangement of its parts, as hereinafter described.

In the accompanying drawings, Figure 1 is a longitudinal sectional view of a hub of a wheel and the roller-bearing. Fig. 2 is a transverse sectional view of the bearing cut on the line $xx$ of Fig. 1. Fig. 3 is a perspective view of the axle and bearing. Fig. 4 is a perspective view of the hub-box.

The invention is adapted to be used in conjunction with the ordinary spindle now in use on vehicles. The rollers 1 1 surround the spindle and bear at one end against the collar 2, and at the other end are retained by the nut 3, which screws on the axle-thread. The rollers are surrounded by the casing 4, which also bears at its ends against the collar 2 and the nut 3. Said casing is provided with the oil-vents 5, and the diameter of the ends 10 10 of the casing is greater than the diameter of the intermediate part. The rear end of the casing is provided with the lugs 6.

The hub-box 7 is located in the wheel-hub, as shown in Fig. 1. The rear end of the box is provided with notches 11 11 to receive the lugs 6 of the casing 4 when the parts are put together. The hub is retained on the axle by the axle-nut 8, which is provided with a flange 9, that bears against the nut 3, and thus serves as a nut-lock. (See Fig. 1.) The parts are put together as shown in Fig. 1, the box 7 resting at each end on the enlarged ends 10 10 of the casing 4. As the wheel revolves, the casing 4 also revolves around the rollers 1, the rollers supporting the casing along its entire length and reducing the friction. It will be observed that the wheel can be removed from the spindle without displacing the rollers or letting them fall out as they are held by the casing 4.

Having described my invention, what I claim as new, and desire to secure by Letters Patent, is—

1. In combination with a spindle, a bearing consisting of rollers surrounding the spindle; a casing inclosing the rollers and retaining them in place; a device, other than that by which the box is kept on the spindle, for retaining the inclosing casing in position, said device being adjustably secured on the spindle and bearing against the end of the casing; a box adapted to engage the casing and to revolve the same about the rollers, said box adapted to be removed from the spindle without removing the casing, as set forth.

2. In combination with a spindle, a bearing consisting of rollers surrounding the spindle; a casing inclosing the rollers and retaining them in place; a device, other than that by which the box is kept on the spindle, for retaining the inclosing casing in position, said device being adjustably secured on the spindle and bearing against the end of the casing, a box adapted to engage the casing and to revolve the same about the rollers, said box adapted to be removed from the spindle without removing the casing; a nut located on the spindle and having an inwardly extending flange adapted to bear against said casing-retaining device, and a radially extending flange adapted to bear against the end of the box, and retain the same on the spindle, as set forth.

In testimony whereof I affix my signature in presence of two witnesses.

GEORGE W. CHELTON.

Witnesses:
JOHN SIGNY STEVENSON,
CLARENCE P. LANKFORD.